United States Patent
Krieger et al.

(10) Patent No.: US 10,968,823 B1
(45) Date of Patent: Apr. 6, 2021

(54) METHOD AND SYSTEM FOR WEAR ESTIMATION

(71) Applicant: Caterpillar Inc., Peoria, IL (US)

(72) Inventors: Jeffrey C. Krieger, Brimfield, IL (US); Sravan K. Karri, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/663,774

(22) Filed: Oct. 25, 2019

(51) Int. Cl.
*F02B 77/08* (2006.01)
*F02D 41/38* (2006.01)
*F02D 41/22* (2006.01)

(52) U.S. Cl.
CPC .......... *F02B 77/082* (2013.01); *F02B 77/083* (2013.01); *F02D 41/22* (2013.01); *F02D 41/38* (2013.01); *F02D 2041/228* (2013.01); *F02D 2041/389* (2013.01); *F02D 2200/0602* (2013.01); *F02D 2200/101* (2013.01)

(58) Field of Classification Search
CPC ...... F02B 77/082; F02B 77/083; F02D 41/38; F02D 41/22; F02D 2041/389; F02D 2200/0602; F02D 2200/101; F02D 2041/228
See application file for complete search history.

(56) References Cited

U.S. PATENT DOCUMENTS

| | | | |
|---|---|---|---|
| 6,360,773 B1* | 3/2002 | Rhodes | F16K 37/0083 137/554 |
| 8,099,231 B1* | 1/2012 | Suwa | F02D 41/221 701/111 |
| 8,755,985 B2 | 6/2014 | Vieira | |
| 2005/0114088 A1 | 5/2005 | Gorden et al. | |
| 2008/0004836 A1* | 1/2008 | Tewes | G05B 23/0221 702/182 |
| 2019/0128204 A1* | 5/2019 | Leblon | F02D 41/2467 |
| 2019/0226416 A1* | 7/2019 | Zurlo | F02D 41/22 |

FOREIGN PATENT DOCUMENTS

| | | |
|---|---|---|
| CN | 106408687 A | 2/2017 |
| JP | 2019060279 A | 4/2019 |
| WO | 2017/218211 A1 | 12/2017 |
| WO | 2019/115342 A1 | 6/2019 |

* cited by examiner

*Primary Examiner* — Xiao En Mo
(74) *Attorney, Agent, or Firm* — Bookoff McAndrews

(57) ABSTRACT

A method for estimating wear of at least one component of an internal combustion engine includes receiving sensor information and fuel commands indicative of an amount of fuel supplied to at least one combustion chamber of the internal combustion engine and determining an incremental increase in an amount of wear of at least one component of the internal combustion engine based on at least the sensor information and the fuel commands. The method also includes determining an updated amount of wear based on the incremental increase in the amount of wear, and outputting a notification indicative of the updated amount of wear.

20 Claims, 4 Drawing Sheets

METHOD AND SYSTEM FOR WEAR ESTIMATION

TECHNICAL FIELD

The present disclosure relates generally to internal combustion engine systems, and more particularly, to methods and systems for estimating wear of a component of an internal combustion engine.

BACKGROUND

Internal combustion engines include multiple components that experience repeated stress and wear due to the harsh environment created by the operation of the engine. For example, an engine may include various valves, seals, gaskets, bearings, or other components, that experience wear, e.g., by moving with respect to another component of the engine. In some components, such as valve elements and/or valve seat of a valve train, this wear is characterized by the gradual removal of material over time. This occurs, at least in part, due to the repeated motion of the valve elements into and out of contact with a respective valve seat. In some engines, the valve seat may be removable from a head of the internal combustion engine. During a procedure such as a top end service, the valve element and valve seat may be replaced.

Components of the internal combustion engine are generally replaced at various predetermined service intervals in order to prevent the component from becoming excessively worn. These intervals may be based on a time of operation (e.g., engine hours), number of cycles (e.g., engine revolutions), etc., of the internal combustion engine. This predetermined service interval may need to be set based on a conservative estimate of the lifetime of the respective part. For example, a lifetime for a valve or other valve train component may be set for a particular number of hours of operation that is based on a typical wear pattern.

While service intervals may be useful as rough estimates, set or unchangeable service intervals may fail to accurately correspond to the actual wear rate for the respective component(s) of the engine. For example, engines that frequently operate at relatively high power outputs, fuel rates, engines speeds, etc., may experience wear at a pace that is significantly faster than the pace on which the predetermined service interval is based. Conversely, engines that frequently operate at relatively low outputs, fuel rates, and/or speeds, may experience wear at a rate that is significantly slower than the predetermined service interval. Thus, predetermined service intervals may, in some circumstances, result in the premature replacement of costly parts for engines that wear at a relatively slow rate. Moreover, engines that have a high power density that operate at relatively high outputs may have components that experience faster wear and detrimental operation and even component failure before a predetermined service interval.

A system for component wear predication is disclosed in U.S. Patent Application Publication No. 2005/0114088 (the '088 publication) to Gorden et al. The component wear prediction system described in the '088 publication patent includes a monitoring system that electronically monitors exhaust temperate, as high exhaust temperate may indicate worn or improperly seated valves. The system in the '088 publication may collect information that is applied to rules and models to predict when and if the observed components will require maintenance or overhaul. However, the system of the '088 publication may not be useful in quantifying and estimating an amount of wear experienced by one or more engine components, or for determining when an engine component is expected to have a significantly shorter or longer life than average. Additionally, as the system disclosed in the '088 publication may be established based on failures, it may be unsuitable for predicting wear in situations where failure is not imminent.

The disclosed method and system may solve one or more of the problems set forth above and/or other problems in the art. The scope of the current disclosure, however, is defined by the attached claims, and not by the ability to solve any specific problem.

SUMMARY

In one aspect, a method for estimating wear of at least one component of an internal combustion engine may include receiving sensor information and fuel commands indicative of an amount of fuel supplied to at least one combustion chamber of the internal combustion engine and determining an incremental increase in an amount of wear of at least one component of the internal combustion engine based on at least the sensor information and the fuel commands. The method may also include determining an updated amount of wear based on the incremental increase in the amount of wear, and outputting a notification indicative of the updated amount of wear.

In another aspect, a method for estimating wear in a valve train of an internal combustion engine may include receiving sensor information associated with an operation of the internal combustion engine over a first period of time, determining, based on at least the sensor information for the first period of time, a first incremental increase in an amount of wear of at least one component of the valve train, and receiving sensor information indicative of the operation of the internal combustion engine over a second period of time, and determining, based on at least the sensor information for the second period of time, a second incremental increase in the amount of wear. The method may also include determining, based on the first incremental increase and the second incremental increase, an updated amount of wear, and outputting a notification indicative of the updated amount of wear.

In yet another aspect, a wear estimation system for an internal combustion engine may include a fuel injector configured to inject fuel toward a combustion chamber, a sensor configured to output information associated with an amount of fuel supplied to the internal combustion engine, at least one valve train component, and a controller. The controller may be configured to control an operation of the fuel injector by outputting commands to the fuel injector, receive the information output from the sensor, and determine an incremental increase in an amount of wear of the at least one valve train component based on at least the sensor information. The controller may also be configured to update the amount of wear based on the incremental increase, and output a notification indicative of the updated amount of wear.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," "substantially," "generally," and "approximately" are used to indicate a possible variation of ±10% in the stated value.

Figure 1:
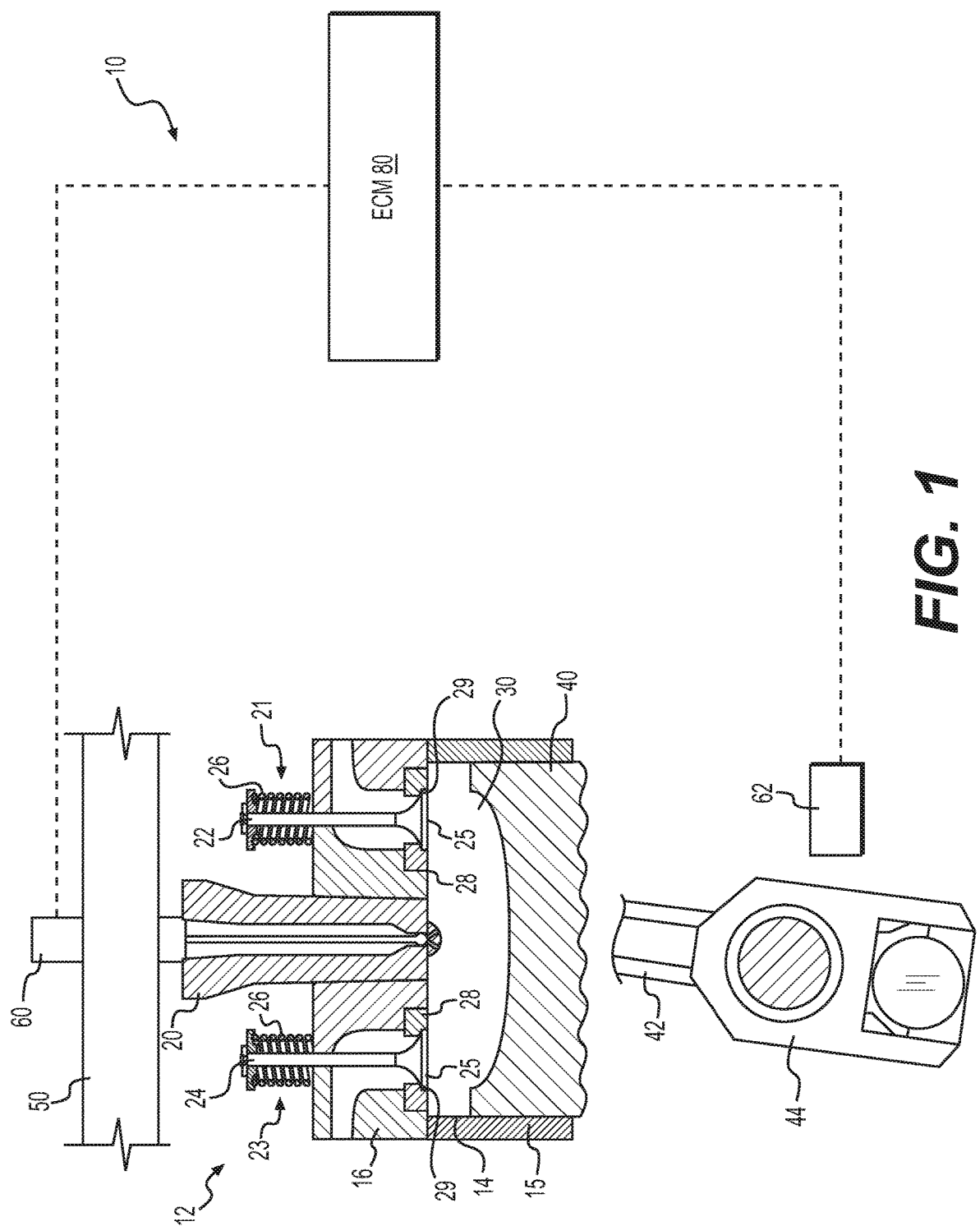
FIG. 1 is a schematic diagram illustrating a control system according to an aspect of the present disclosure.

FIG. 1 is a schematic diagram illustrating a control or wear estimation system 10 including an internal combustion engine 12, at least one sensor, and one or more controllers or electronic control modules 80. In an exemplary configuration, the electronic control module or ECM 80 of estimation system 10 may be configured to monitor and control various aspects of the operation of internal combustion engine 12. For example, ECM 80 may be in electrical communication with sensors, such as a fuel sensor 60, and an engine speed or crankshaft speed sensor 62, as well as other sensors and a plurality of fuel injectors 20. System 10 may be configured to determine an estimated amount of wear that accumulates in one or more components of engine 12. In particular, system 10 may be configured to estimate an amount of cumulative wear, e.g., in the form of removed material, that is experienced by one or more valves 21, 23 of the internal combustion engine 12. Each valve 21, 23 may include a valve element 22, 24 and a valve seat 29. Each valve seat 29 may be provided on a replaceable valve insert 28 in an engine head 16.

Internal combustion engine 12 may be any suitable engine, such as a diesel or gasoline engine. If desired, engine 12 may alternatively be configured to operate via the combustion of a gaseous fuel, such as a natural gas, alone or in combination with diesel fuel. Engine 12 may include a plurality of cylinders 14 formed within an engine block 15, one exemplary cylinder 14 being shown in FIG. 1. Each cylinder 14, along with an engine head 16, may define a combustion chamber 30 into which fuel is injected. A piston 40 that reciprocates in cylinder 14 may be connected via a rod 42 to a crankshaft 44 to provide power to perform work, generate electricity, provide locomotion, etc., in a known manner.

Combustion chamber 30 may be configured to receive a supply of air from an air passage (not shown) by one or more intake valves 21, and a supply of fuel from a fuel injector 20. Exhaust valves 23 may be positioned within engine head 16 and configured to selectively block or permit passage of combustion products (exhaust gases) from combustion chamber 30 to an exhaust passage (not shown). Intake valve element 22 of intake valves 21 and exhaust valve elements 24 of exhaust valves 23 may be biased toward a closed position (shown in FIG. 1) by respective valve springs 26. When in this closed position, a valve head 25 of the respective valve elements 22, 24 may rest upon a valve seat 29 provided on a surface of a valve insert 28. Valve insert 28 may be formed by an approximately annular-shaped insert within head 16, formed of any metallic and/or polymeric material suitable for use within engine 12. Each valve insert 28 may be removably fixed within head 16 to facilitate servicing and replacement of each valve insert 28.

In an exemplary configuration, diesel fuel may be injected within combustion chamber 30 toward piston 40 by one or more fuel injectors 20 for each cylinder 14. In one aspect, a fuel supply passage 50 may include a fuel rail (e.g., a common fuel rail) that stores pressurized fuel for supply to a plurality of fuel injectors. A fuel sensor 60 of system 10 may be provided in fuel supply passage 50 to produce a signal indicative of an amount of fuel that is provided to (and injected by) fuel injector 20. In one aspect, when fuel injector 20 is a unit injector for a common rail fuel supply system, fuel sensor 60 may be a fuel pressure sensor provided within the common fuel rail for a plurality of fuel injectors 20. Fuel injector 20 may be electronically-controlled by ECM 80. For example, ECM 80 may be configured to output a signal to one or more solenoid-controlled valves (not shown) within fuel injector 20. These commands may allow ECM 80 to control a duration of fuel injection and a timing (e.g., a start and end) of fuel injection. While the injector 20 of the exemplary configuration shown in FIG. 1 may be used in a common rail fuel supply system, fuel injector 20 may instead be a mechanically-driven or hydraulically-driven electronically-controlled unit injector usable to deliver fuel that is pressurized by the motion of a cam-driven plunger. In mechanically-driven fuel injectors, sensor 60 may be omitted.

In one aspect, system 10 may include one or more sensors configured to detect a speed of engine 12. For example, an engine speed sensor 62 may be in communication with ECM 80. Engine speed sensor 62 may be any suitable engine speed sensor, such as one or more hall effect sensors. In one aspect, speed sensor 62 may be configured to output a signal indicative of a speed of rotation of crankshaft 44. Engine speed sensor 62 may, if desired, measure rotation of one or more other locations indicative of a speed of engine 12 (e.g., a pulley, flywheel, camshaft, etc.). The signals output by fuel sensor 60 and engine speed sensor 62 may also be indicative of an output of engine 12, as described below.

Figure 2:
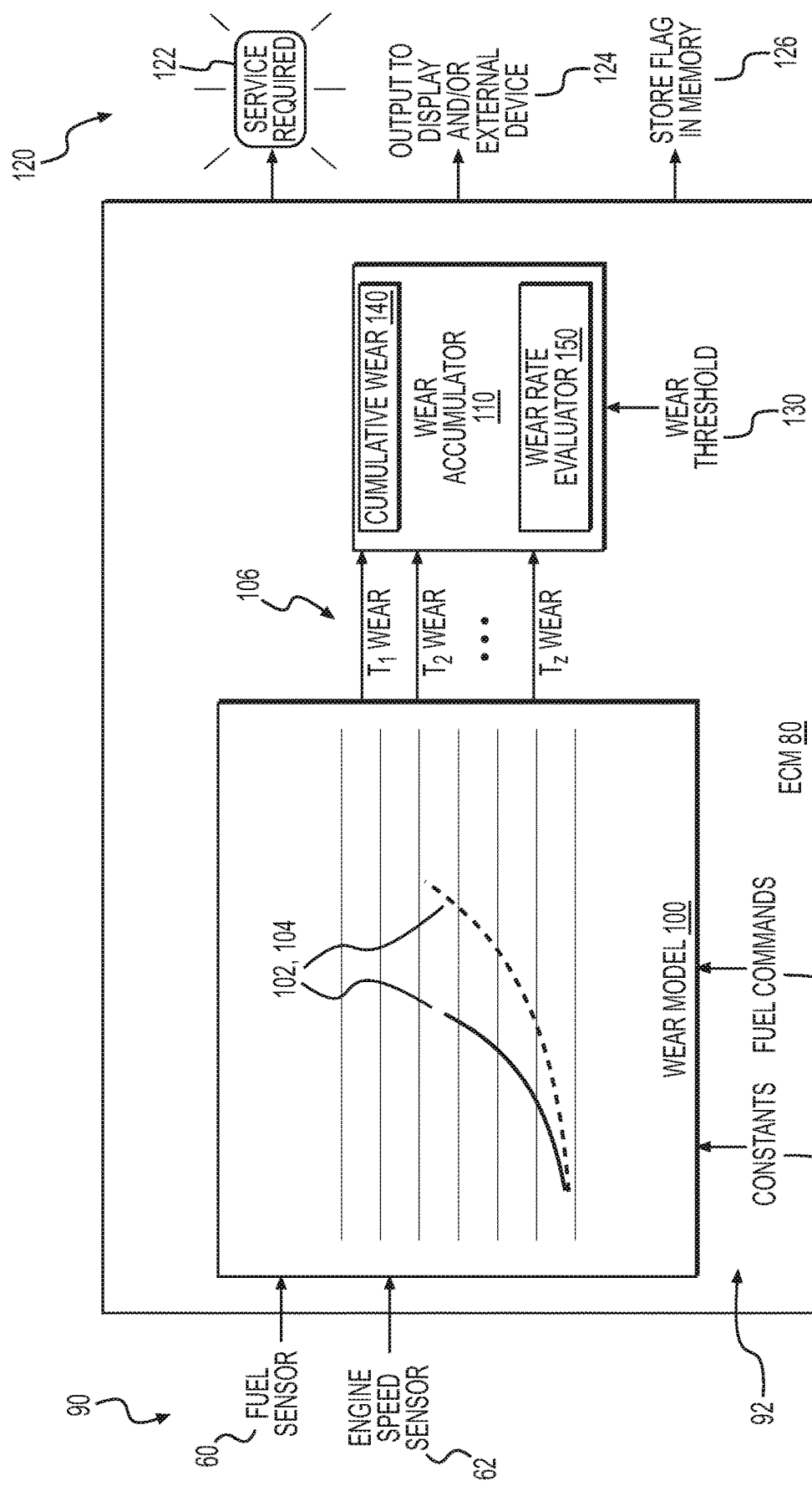
FIG. 2 is a block diagram illustrating an exemplary configuration of a controller of the valve wear estimation system of FIG. 1.

FIG. 2 is a block diagram showing an exemplary configuration of an ECM 80 configured to perform method 200, as described below. ECM 80 may receive a plurality of sensed inputs 90 and output one or more outputs 120. ECM 80 may also include a wear model 100 and a wear accumulator 110 with a wear rate evaluator 150. Sensed inputs 90 may include signals output from one or more sensors, including fuel sensor 60 (e.g., a fuel pressure sensor) and engine speed sensor 62 that are received at wear model 100 via ECM 80. ECM 80 may also receive any other sensor information useful in operating engine 12, such as one or more airflow sensors, temperature sensors, etc. ECM 80 may be configured to receive other inputs, such as a torque requested by an operator. One or more calculated or stored inputs 92 may also be stored (or generated) by ECM 80 and received at wear model 100, such as one or more constants 94 and one or more fuel commands 96 associated with injectors 20. All of the fuel sensor 60, engine speed sensor 62, and fuel commands 96 may be indicative of an amount of fuel supplied to one or more combustion chambers 30 and are received by wear model 100. ECM 80 may be configured to generate outputs 120 based on a wear approximation or estimation performed in conjunction with one or more of sensed inputs 90 and one or more calculated or stored inputs 92. These outputs 120 may be in the form of a command signal to any suitable output device such as a display (including a display in a vehicle, an indication light, or any other interface associated with ECM 80), a wireless or wired communication to a computing device (e.g., computer, cellular phone, tablet, or any portable computing device), or to store information in a memory associated with ECM 80. In addition to outputs 120, ECM 80 may output control signals to a plurality of electronically-controllable components of engine 12 based on one or more such requests, either directly or by one or more intermediate controllers. For example, ECM 80 may be configured to output commands to each fuel injector 20 (e.g., fuel commands 96 that define the duration of fuel injection), commands to control valve timing, hydraulic components, or other commands.

ECM 80 may embody a single microprocessor or multiple microprocessors that receive inputs and issue control signals. ECM 80 may include a memory, a secondary storage device, a processor, such as a central processing unit or any other means for accomplishing a task consistent with the present disclosure. The memory or secondary storage device associated with ECM 80 may store data and software to allow ECM 80 to perform its functions. In particular, such data and software in memory or secondary storage device(s) may allow ECM 80 to perform the functions of a wear model 100 and wear accumulator 110. The memory or secondary storage may also store one or more constants 94 (e.g., one or more combustion constants) useful for wear model 100. Further, the memory or secondary storage device associated with ECM 80 may store data received from one or more of the inputs 90 of system 10. Numerous commercially available microprocessors can be configured to perform the functions of ECM 80. Various other known circuits may be associated with ECM 80, including signal-conditioning circuitry, communication circuitry, and other appropriate circuitry.

Wear model 100 may receive, as inputs, sensed inputs 90 and calculated or stored inputs 92. Sensed inputs 90 may include signals from one or both of fuel sensor 60 and engine speed sensor 62. Calculated or stored inputs 92 may include constant values or constants 94 stored in a memory of ECM 80 (or provided via an external controller or memory). Constants 94 may include values such as injector size, engine displacement, combustion coefficients, and any other constants useful to calculate an engine output (such as brake mean effective pressure (BMEP), or power), and/or fuel rate (a quantity of injected fuel over a period of time). Calculated or stored inputs 92 may include, in addition to constants 94, one or more fuel commands 96. As used herein, "fuel commands" define a duration of a fuel injection event (e.g., for fuel injectors 20), as opposed to a number of fuel injections.

Wear model 100 may also include one or more predetermined wear relationships. These relationships may, for example, be in the form of one or more maps, such as one or more engine output maps 102 (FIG. 3) and/or one or more fuel rate maps 104 (FIG. 4). Incremental increases in wear, such as incremental wear values 106, may be determined by wear model 100 based on maps 102, 104 and output to a wear accumulator 110. Wear accumulator 110 may be configured to track an amount of wear of one or more components of engine 12 over time. In exemplary embodiments where system 10 is configured to estimate wear in the form of an amount of material removed from valves 21, 23, incremental wear 106 may correspond to a thickness of the removed material (e.g., in microns). This removed material may correspond to material removed from at least one of valves 21, 23, such as a valve element 22, 24 and valve insert 28 pair. Alternatively, the removed material may correspond to a single component, such as an individual intake valve element 22, exhaust valve element 24, or valve insert 28.

Wear accumulator 110 may calculate and update a cumulative wear value 140 stored in a memory of ECM 80 that represents the estimated wear of one or more components of engine 12. For example, wear accumulator 110 may calculate a sum of each incremental wear value 106 to determine the amount of wear (e.g., removed material) of valves 21, 23. This amount of wear, or cumulative wear value 140, may be determined by the sum of each incremental wear value 106 determined for valves 21, 23. In embodiments where cumulative wear 140 corresponds to a valve train component such as a valves 21, 23, the value of cumulative wear 140 may represent a total amount of material lost by one or more components of valves 21, 23 (e.g., valve elements 22, 24, and valve inserts 28). Cumulative wear 140 and maps 102, 104 may also correspond to an amount of material lost by any other engine component such as piston rings, for example. The value of cumulative wear 140 may be reset (set to zero) each time an engine component, such as valves 21, 23, are replaced. Wear accumulator 110 may be further configured to store a predetermined total wear threshold 130 that represents a maximum tolerable level of wear that may be experienced by one or more engine components prior to replacement of these components. Wear threshold 130 may correspond to a value of, for example, 1 mm., 2 mm., 3 mm., etc.

ECM 80 may provide one or more outputs based on the cumulative wear 140 calculated by wear accumulator 110. In one aspect, ECM 80 may be configured to cause a display to illuminate an indication light 122. ECM 80 may be configured to provide an output 124 to a display or external device, as described below. Furthermore, ECM 80 may provide an output 126 that stores a flag in memory when cumulative wear 140 is equal to or greater than wear threshold 130, and/or when a rate of increase of cumulative wear 140 is substantially larger than or smaller than a predetermined standard rate of wear.

Figure 3:
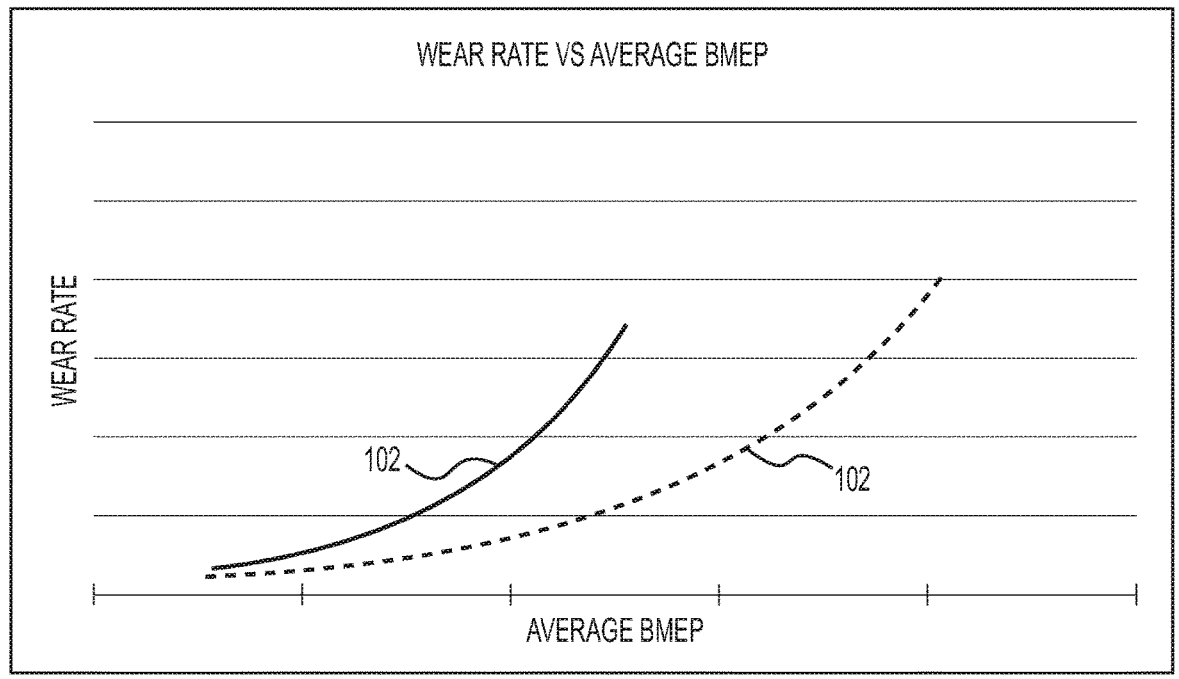
FIG. 3 is a chart illustrating an exemplary wear map according to one aspect of the present disclosure.
Figure 4:
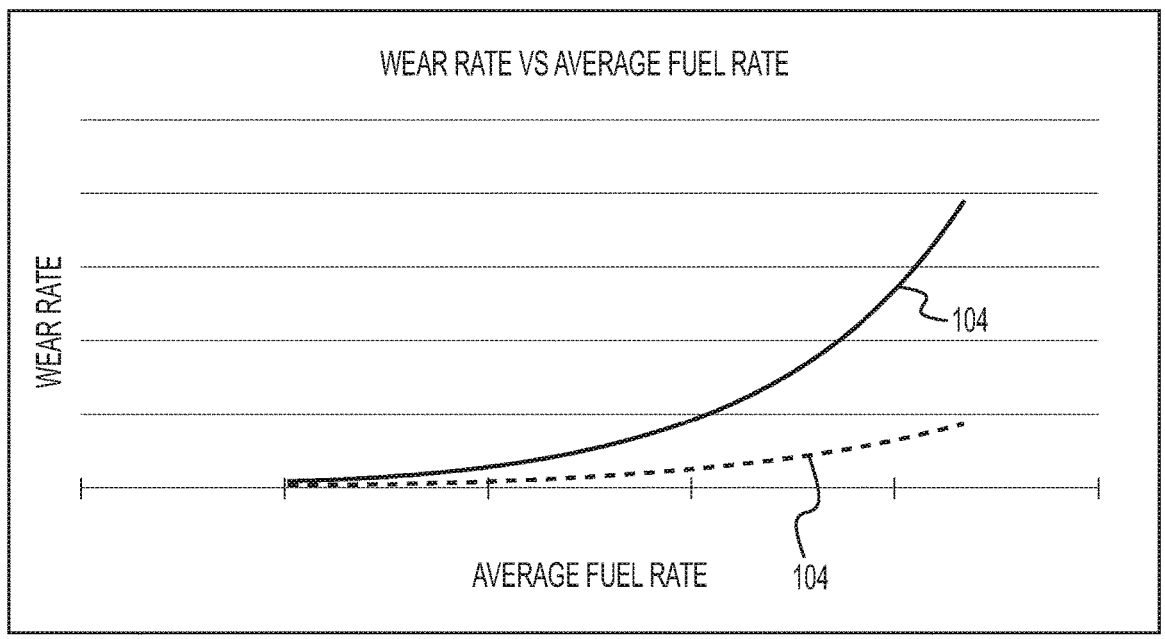
FIG. 4 is a chart illustrating another exemplary wear map according to another aspect of the present disclosure.

FIGS. 3 and 4 are charts representing exemplary relationships between wear rates and an output of engine 12. The exemplary plots included in the charts of FIGS. 3 and 4 may represent of information provided, for example, by a map that stored within memory of ECM 80. In one aspect, each map may define a relationship by which wear model 100 determines incremental wear 106. In particular, output maps 102 and fuel rate maps 104 may represent an average output or fuel rate of engine 12 over a predetermined period of time (e.g., one second, two seconds, 0.5 seconds, etc.). Based on the value of the average output or average fuel rate over this period of time, each map 102, 104 may output a corresponding wear rate. This wear rate (which may be measured in microns per hour), may be converted, if necessary, to an amount of wear in microns or millimeters over the predetermined period of time to provide an incremental wear value 106 (FIG. 2).

As shown in FIG. 3, an output map 102 employed by wear model 100 may have a shape substantially corresponding to an exponential function. Output map 102 may represent a relationship between BMEP (or, alternatively, power) and a wear rate (e.g., a wear rate expected to be experienced by valves 21, 23, or an individual component of valves 21, 23, based on an average BMEP over the predetermined period of time). As shown in FIG. 3, a plurality of different output maps 102 may be stored in wear model 100. In one aspect, each output map 102 may correspond to the relationship between an engine output and a wear rate for a particular engine 12. As can be seen in FIG. 3, this wear rate may be significantly different for different engines 12, and may be based on various structural and operation differences between the engines (e.g., operating temperatures, displacements, fuel pressures, air-pressures, etc.).

FIG. 4 shows a plurality of maps, such as fuel rate maps 104, that may be employed by wear model 100 instead of, or in addition to, output maps 102. Fuel rate maps 104 may represent a relationship between an amount of fuel (e.g., a fuel mass rate) injected by injector 20 over a predetermined period of time. Similar to output maps 102, fuel maps 104 may include first and second maps 104 that represent an wear rates for different engines 12. As can be seen in FIG. 4, these wear rates may differ significantly for different engines 12.

The information used to derive each output map 102 and/or fuel rate map 104 may be determined by empirical analysis. Such empirical data may be obtained by operating engine 12 under predetermined conditions (e.g., under a particular output or fuel rate). One or more engine components 12 may then be removed, and an amount of wear such as material loss may be measured using any suitable method, such as profilometry. Based on data obtained by repeating this process for various outputs and/or fuel rates, a relationship between the amount of wear and the output or fuel mass consumed by engine 12 may be developed. In one aspect, engine 12 may include a plurality of substantially identical components, such as a plurality of valves 21, 23. However, in at least some engines, the wear rates of identical components may vary depending on the particular location (e.g., the particular cylinder 14) in which the component is installed. Thus, the information stored in each map 102, 104 may correspond to the maximum expected wear rate across the plurality of valves 21, 23 of engine 12, taking into account the different rates at which these components experience wear. For example, in an engine having a plurality of valves 21, 23 for a plurality of cylinders 14, wear maps 102, 104 may correspond to the wear measured for the valve 21, 23 at a location (e.g., a particular cylinder) that experiences wear at the fastest rate.

Industrial Applicability

Wear estimation system 10 may be used in conjunction with any appropriate machine or vehicle that includes an internal combustion engine. For example, wear estimation system 10 may be employed on machines such as air compressors, grinders, harvesters, pumps, crushes, wood chippers, recyclers, milling machines, trucks, or any other machine or vehicle.

During operation of internal combustion engine 12, one or more functions of engine 12, such as the operation of fuel injectors 20, may be controlled by ECM 80 via the output of commands such as fuel commands 96. Thus, fuel, such as diesel fuel, may be injected into combustion chamber 30 and combusted to generate power in a known manner. ECM 80 of wear estimation system 10 may be configured to monitor (estimate) wear of one or more components of engine 12, and may provide one or more outputs corresponding to the cumulative amount of wear 140 as cumulative wear 140 is updated over time, and/or the rate at which the cumulative wear 140 increases over time.

Figure 5:
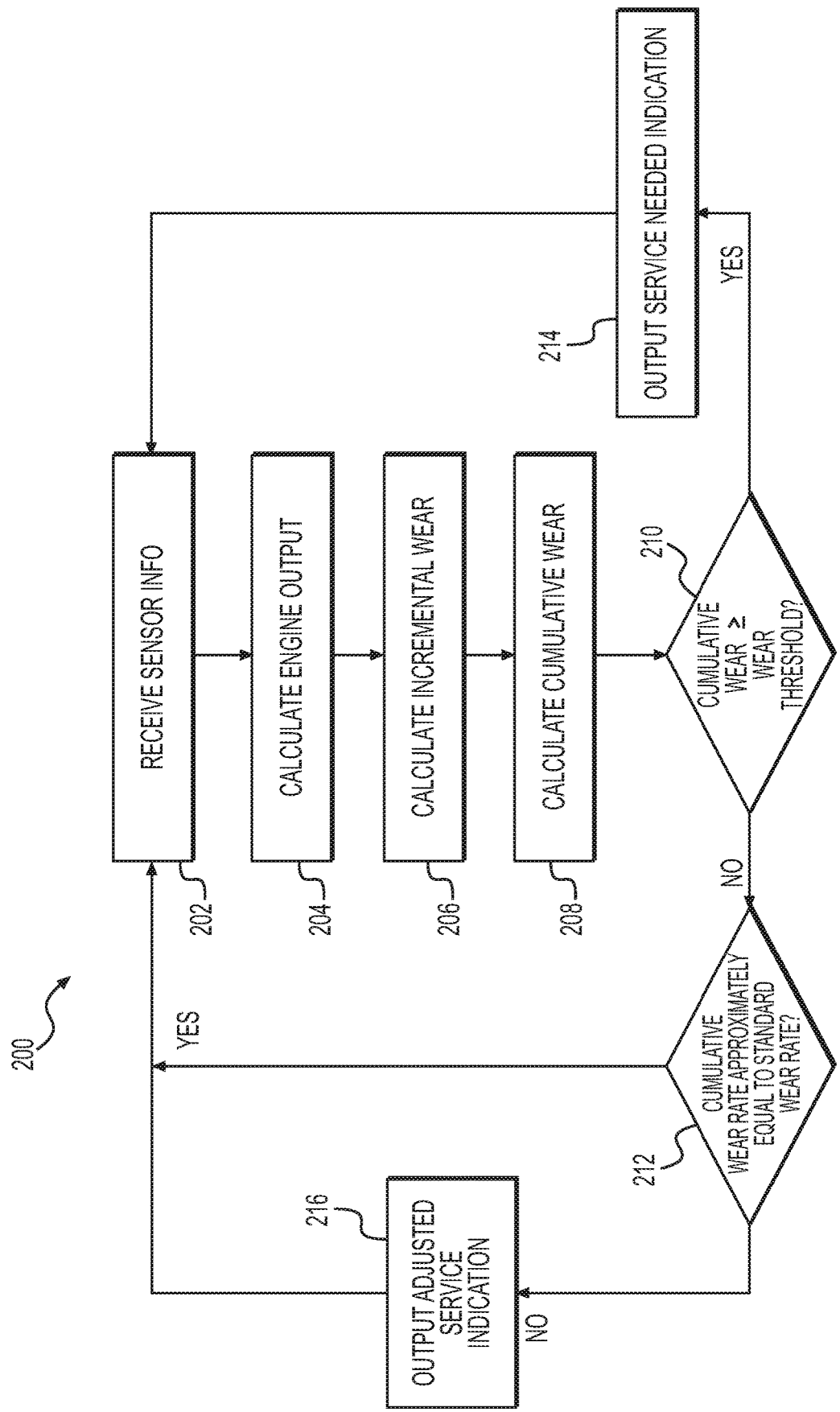
FIG. 5 is a flowchart illustrating an exemplary method according to an aspect of the present disclosure.

FIG. 5 is a flowchart illustrating an exemplary process 200 that may be performed by wear estimation system 10 in order to approximate or estimate wear of at least one component, such as a valve train component, of engine 12. In one aspect, process 200 may generally include determining a value of cumulative wear 140 and providing one or more outputs based on cumulative wear 140. Process 200 may also generally include receiving sensor information, calculating an engine output (BMEP and/or power), determining a fuel rate, determining a plurality of values of incremental wear 106, updating a value of cumulative wear 140, and providing one or more outputs when cumulative 140 wear exceeds a threshold (such as wear threshold 130) or increases at a relatively fast rate or a relatively slow rate with respect to a target or standard rate.

In one step 202, sensor information indicative of an operation of engine 12 may be received by ECM 80. For example, step 202 may include receiving one or more sensed inputs 90 (FIG. 2) including a signal input from a fuel sensor 60. The signal from fuel sensor 60 may be associated with or indicative of an engine output (BMEP or power) of engine 12. This signal from fuel sensor 60 may also be indicative of an amount of fuel supplied to combustion chamber 30 or a corresponding fuel rate (e.g., for fuel injectors 20 used with a common fuel rail). The sensed inputs 90 received in step 202 may include a signal input from engine speed sensor 62 that corresponds to a speed of engine 12. The signal from engine speed sensor 62 may be associated with or indicative of engine output and/or an amount of fuel supplied to chamber 30 or a corresponding fuel rate (e.g., for mechanical fuel injectors 20). For example, engine speed sensor 62 may correspond to a velocity of a plunger for a fuel injector 20. This plunger velocity may correspond to a rate at which fuel is injected into each combustion chamber 30 for an engine 12 that does not include a common fuel rail.

In a step 204, an engine output (such as BMEP or power) may be determined or calculated based on the one or more sensed inputs 90 received in step 202. BMEP, an exemplary engine output, may be calculated based on a constant 94 (e.g., displacement of engine 12), and a torque. Torque may be determined based on information associated with fuel pressure (e.g., from engine speed sensor 62 and, if necessary, fuel sensor 60), as well as with fuel commands 96 (commands defining the duration of fuel injection) and one or more constants 94 (engine displacement, a numerical coefficient, etc.). Power, like torque, may be calculated based on information associated with fuel pressure, fuel commands 96, and one or more constants 94. In one aspect, the engine output calculated in step 204 may correspond to a predetermined period of time, as described above. The engine output may therefore represent an average output over the predetermined period of time. This average output may be provided to wear model 100.

In an alternative aspect, step 204 may be performed by determining or calculating a fuel rate instead of an engine output. The fuel rate may be calculated for a predetermined period of time and may represent an average fuel rate (e.g., as measured in grams per minute) over this period of time. For example, fuel sensor 60 may output a signal representative of a pressure of fuel in a common rail. ECM 80 may be configured to calculate fuel rate based on this sensed pressure, constants 94 (e.g., injector orifice size) and based on fuel commands 96, which may include commands defining the duration of injection for one or more injection events. Alternatively, when injector 20 is a mechanical injector, ECM 80 may calculate the fuel rate based at least in part on engine speed sensor 62 and fuel commands 96.

In step 206, wear model 100 may process the engine output calculated in step 204 to determine or calculate an amount of incremental wear 106. This incremental wear may be provided for a single component, such as an individual valve element 22, 24, and/or for a group of elements such as valve 21 (and/or valve 23). In one aspect, incremental wear 106 may be provided based on a lookup performed with an engine output map 102, as represented as a curve in FIG. 3. Alternatively, step 206 may be performed by processing a fuel rate calculated in step 204, with the use of a fuel rate map 104, as represented as a curve in FIG. 4.

Each map 102, 104 may define a relationship between an input value (e.g., engine output) and an incremental amount of wear. In particular, each map 102, 104 may define a predetermined relationship between one of these input values and an amount of material removed from valves 22, 24 over time due to the repeated opening and closing of valves 22, 24. The maps 102, 104 of wear model 100 may be defined by a function in which an engine output is used to calculate an amount of wear experienced by a valve head 25 and valve insert 28 pair, for example. In particular, an average BMEP over a predetermined period of time (such as approximately 1 second) may be input into a function defined by an equation such as exemplary equation E1: $T_Z = A(e^{BX})$. In equation E1, an incremental amount of wear experienced over this predetermined period of time is represented by $T_Z$, A and B are constants determined empirically as described below, and X represents average BMEP, average power, or average fuel rate over the predetermined period of time. The incremental amount of wear 106 may correspond to the value of $T_Z$, which may be measured in units such as microns. When BMEP is employed for X in equation E1, X may be measured in units of kPa or psi. When power is employed for X in equation E1, X may be measured in kW. When fuel rate is employed for X in equation E1, X may be measured in grams (or kilograms) of fuel per unit time. As understood, the values of A and B will change based on the measurement employed or X and based on the characteristics of the particular engine 12. The values of A and B may be determined based on empirical data, as described above.

By providing the engine output or fuel rate as an input to an appropriate map 102, 104, wear model 100 may calculate and output an incremental wear value 106 that represents an incremental increase in the amount of wear represented by cumulative wear 140. This value may correspond to the wear experienced over the predetermined period of time over which the average engine output or fuel rate was generated by engine 12. As understood, each map 102, 104 may be provided as a table of values which allow ECM 80 to perform interpolation, as necessary, during the calculation of incremental wear 106. Alternatively, ECM 80 may calculate the value of $T_Z$ with equation E1 without performing interpolation.

In a step 208, the incremental wear value 106 calculated in step 206 may be output to wear accumulator 110 of ECM 80. Wear accumulator 110 may then determine (calculate) an updated value of cumulative wear 140. In one aspect, cumulative wear 140 may represent a sum of the incremental wear 106 calculated in step 206 and each incremental wear 106 that has been calculated during the life of valves 22, 24 and/or valve insert 28. Cumulative wear 140 may be stored in a memory of ECM 80 and may be updated each time a new incremental wear 106 is received by wear accumulator 110. Steps 202-208 may be repeated over a plurality of substantially identical periods of time to calculate a first incremental amount of wear of a first period of time, a second incremental amount of wear over a second period of time, etc., that are used to update cumulative amount of wear 140. By performing steps 202-208, ECM 80 may, in real time, monitor and update (increase) an estimated amount of wear. While the predetermined period of time associated with each incremental wear value 106 may be the same, the values 106 themselves may be different from each other.

In a step 210, ECM 80 may determine whether cumulative wear 140 is greater than or equal to predetermined wear threshold 130. This may be determined by comparing the value of cumulative wear 140, which may represent an amount of removed material (e.g., in microns or millimeters), to wear threshold 130, which may also represent an amount of removed material on the order of a few millimeters. If desired, step 210 may include comparing cumulative wear 140 to a plurality of predetermined thresholds (e.g., threshold that correspond to 50%, 75%, 90%, etc., of the value of cumulative wear 140).

When the cumulative wear 140 is equal to or larger than wear threshold 130, step 214 may be performed. During step 214, one or more notifications or outputs 120 (FIG. 2) may be generated by ECM 80. For example, the notification may be presented on an output device such as an indication light 122. Indication light 122 may be a component of a display panel on a dashboard of a machine operable with engine 12, for example. The notification may also be presented on a display and/or external device 124, such as a device in communication with ECM 80, to provide information with respect to the value of cumulative wear 140, a rate at which cumulative wear 140 has increased over time, a comparison of the rate at which cumulative wear 140 has increased over time in comparison to a standard wear rate, and/or an expected timing at which cumulative wear 140 will exceed wear threshold 130 (or an indication that cumulative wear 140 has reached a value in excess of, for example, 50%, 75%, 90%, of wear threshold 130). In the example of a worn valve train component such as valves 21, 23, ECM 80 may output a notification to indicate that valve 21, 23 should be inspected and/or replaced, and/or that a lash of the valve train should be inspected and/or adjusted, either at the present time or at a future time based on a forecast, as described below. Step 214 may include storing the above-described information in the form of a flag in a memory associated with ECM 80. As step 214 is performed based on an engine output and not solely on engine-hours or engine cycles, ECM 80 may be configured to change a timing of the notification based on the rate at which cumulative wear 140 increases. When the cumulative wear 140 is not equal to or larger than wear threshold 130, process 200 may proceed to an optional step 212. When optional step 212 is not performed, the process may instead return to step 202.

In step 212, wear rate evaluator 150 may assess an increase or decrease in a rate at wear 140 accumulates over time (e.g., with respect to engine-hours or engine cycles). This may be determined, for example, by calculating a rate of change of cumulative wear 140 with respect to a predetermined operating time of engine 12. Wear rate evaluator 150 may then compare the determined rate of increase to a predetermined average or standard wear rate. This standard wear rate may be a predetermined value stored in a memory of ECM 80 which is derived from empirical data for the component of engine 12. When wear rate evaluator 150 determines that the rate of increase of cumulative wear 140 is approximately the same as the standard wear rate, process 200 may return to step 202. For example, the rate of increase of cumulative wear 140 may be considered approximately equal to the standard wear rate when the difference between the two is ±10% or less. Alternatively, these two values may be considered approximately equal when the increase in cumulative wear 140 deviates ±5%, ±15%, or ±20%, or less, in comparison to the standard wear rate. If desired, wear rate evaluator 150 may compared to a previous rate of wear instead of, or in addition to, a standard wear rate. The previous rate of wear may be a prior wear rate estimated by ECM 80.

When cumulative wear 140 increases by a rate that is ±10% or more, for example, of the standard wear rate (and/or a previous wear rate), step 216 may be performed. In an example where the cumulative wear 140 increases by a rate that is at least 10% larger (faster) than the standard wear rate, ECM 80 may output an adjusted service indication in step 216. This adjusted service indication may indicate that an individual component or group of components of engine 12, such as a valves 21, 23, are expected to require service and/or replacement at a timing that is earlier than a standard timing. Conversely, if the cumulative wear 140 increases by a rate that is 10% less than (slower) than the standard wear rate, ECM 80 may output an adjusted service indication that indicates that the component(s) of engine 12 are expected to require service and/or replacement at a later timing as compared to the standard timing. Step 216 may include providing one or more of outputs 122, 124, 126 that indicate that the rate of change of cumulative wear 140 is significantly (10%) larger or smaller than a previous rate of change. Additionally, one or more of outputs 122, 124, 126 may indicate a forecast of a timing at which valves 21, 23 are expected to reach cumulative wear 140, or are expected to require service and/or replacement. This forecast may be static (e.g., based on a historical wear rate), or may be dynamic (e.g., updated when the rate of wear increases or decreases). The forecast may provided on a display via output 124, for example, and may be in the form of an estimated number of engine-hours, miles, days, etc. The forecast of output 124, for example, may be updated or adjusted at predetermined intervals, and may be displayed continuously, if desired.

Regardless of the particular information provided in the adjusted service indication of step 216, the indication may be provided as one or more of outputs 122, 124, 126, as described above. Process 200 may then return to step 202. As process 200 is repeated, notifications issued during step 214, for example, may have increasing urgency, for example, when cumulative wear 140 exceeds wear threshold 130 by one or more predetermined amounts.

In at least some embodiments, by providing a system 10 configured to estimate accumulated wear in one or more components of an engine 12, it may be possible to accurately estimate wear accumulation based on operation history of the engine. Thus, it may be possible to increase the protection of a user from unexpected engine failure. For example, it may be possible to identify when engine 12 may require more frequent service intervals, and provide one or more notifications informing an operator or technician. Additionally, it may be possible to inform the operator or technician when engine 12 may require less frequent service intervals. This may make it possible to avoid performing unnecessary maintenance on the engine. By estimating and monitoring an amount of accumulated wear, it may therefore be possible to perform targeted service on engine 12, such as replacement of a valve 22, 24 and valve seat 28.

It will be apparent to those skilled in the art that various modifications and variations can be made to the disclosed apparatus and system without departing from the scope of the disclosure. Other embodiments of the apparatus and system will be apparent to those skilled in the art from consideration of the specification and practice of the apparatus and system disclosed herein. It is intended that the specification and examples be considered as exemplary only, with a true scope of the disclosure being indicated by the following claims and their equivalents.

What is claimed is:

1. A method for estimating wear of at least one component of a valve train of an internal combustion engine, comprising:
receiving sensor information and fuel commands indicative of an amount of fuel supplied to at least one combustion chamber of the internal combustion engine;
determining an incremental increase in an amount of wear of the at least one component of the valve train of the internal combustion engine based on at least the sensor information and the fuel commands;
determining an updated amount of wear based on the incremental increase in the amount of wear; and
outputting a notification indicative of the updated amount of wear.

2. The method of claim 1, wherein the sensor information includes at least a fuel pressure.

3. The method of claim 1, wherein the sensor information includes at least a speed of the internal combustion engine.

4. The method of claim 1, wherein the amount of wear is updated based on at least sensor information associated with fuel pressure and sensor information indicative of the speed of the internal combustion engine.

5. The method of claim 1, wherein the amount of wear is updated based on a map representative of empirical data of wear experienced by the at least one component of the valve train of the internal combustion engine with respect to an engine output or with respect to the amount of fuel.

6. The method of claim 1, wherein the notification is indicative of a need to replace or perform service on the at least one component of the valve train of the internal combustion engine.

7. The method of claim 1, further including providing a notification indicative of a timing at which the amount of wear will exceed a predetermined threshold based on a determined rate of increase of the amount of wear.

8. The method of claim 1, wherein the amount of wear is updated based on at least an engine output.

9. The method of claim 1, wherein the notification is output when a rate at which the amount of wear increases is different than a predetermined wear rate.

10. A method for estimating wear in a valve train of an internal combustion engine, comprising:
receiving sensor information indicative of an operation of the internal combustion engine over a first period of time;
determining, based on at least the sensor information for the first period of time, a first incremental increase in an amount of wear of at least one component of the valve train;
receiving sensor information indicative of the operation of the internal combustion engine over a second period of time;
determining, based on at least the sensor information for the second period of time, a second incremental increase in the amount of wear;
determining, based on the first incremental increase and the second incremental increase, an updated amount of wear; and outputting a notification indicative of the updated amount of wear.

11. The method of claim 10, wherein the first period of time is approximately equal to the second period of time, and wherein the first incremental increase in the amount of wear is different than the second incremental increase in the amount of wear.

12. The method of claim 10, wherein the at least one component of the valve train includes at least an intake valve or an exhaust valve.

13. The method of claim 10, wherein the at least one component of the valve train includes a valve insert.

14. The method of claim 10, wherein the amount of wear corresponds to a maximum amount of wear experienced by a plurality of components of the valve train.

15. The method of claim 14, wherein the amount of wear is indicative of an amount of material removed from at least an intake valve or an exhaust valve, and at least one valve insert.

16. A wear estimation system for an internal combustion engine, the system comprising:
   a fuel injector configured to inject fuel toward a combustion chamber;
   a sensor configured to output information indicative of an amount of fuel supplied to the internal combustion engine;
   at least one valve train component; and
   a controller configured to:
      control an operation of the fuel injector by outputting commands to the fuel injector;
      receive the information output from the sensor;
      determine an incremental increase in an amount of wear of the at least one valve train component based on at least the sensor information;
      update the amount of wear based on the incremental increase; and
      output a notification indicative of the updated amount of wear.

17. The system of claim 16, wherein the sensor is a fuel pressure sensor or an engine speed sensor.

18. The system of claim 16, wherein the notification includes an indication to replace or perform service on the at least one valve train component.

19. The system of claim 16, wherein the controller is configured to output the notification when the amount of wear is equal to or greater than a predetermined amount of wear.

20. The system of claim 16, wherein the amount of wear is an amount of wear of a valve element and a valve seat.

* * * * *